United States Patent
Frank et al.

(10) Patent No.: US 11,381,708 B2
(45) Date of Patent: Jul. 5, 2022

(54) HALFTONE SCREENS COMPRISING CLUSTER PATTERNS HAVING DIFFERENT CENTRE POSITIONS

(71) Applicant: HP Indigo B.V., Amstelveen (NL)

(72) Inventors: Tal Frank, Ness Ziona (IL); Oren Haik, Ness Ziona (IL); Yotam Ben-Shoshan, Ness Ziona (IL); Shay Bornstein, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 134 days.

(21) Appl. No.: 16/632,897

(22) PCT Filed: Oct. 20, 2017

(86) PCT No.: PCT/EP2017/076928
§ 371 (c)(1),
(2) Date: Jan. 22, 2020

(87) PCT Pub. No.: WO2019/076469
PCT Pub. Date: Apr. 25, 2019

(65) Prior Publication Data
US 2021/0368065 A1    Nov. 25, 2021

(51) Int. Cl.
*H04N 1/46* (2006.01)
*H04N 1/405* (2006.01)

(52) U.S. Cl.
CPC ................... *H04N 1/4055* (2013.01)

(58) Field of Classification Search
None
See application file for complete search history.

(56) References Cited

U.S. PATENT DOCUMENTS

| 5,774,229 | A | | 6/1998 | Delabastita | |
|---|---|---|---|---|---|
| 6,128,099 | A | * | 10/2000 | Delabastita | H04N 1/4058 358/1.9 |
| 6,710,778 | B2 | | 3/2004 | Cooper | |
| 7,099,049 | B2 | | 8/2006 | Yu et al. | |
| 7,619,777 | B2 | | 11/2009 | Lee et al. | |
| 7,626,730 | B2 | | 12/2009 | Tai et al. | |
| 7,986,442 | B2 | * | 7/2011 | Lee | H04N 1/4057 358/3.09 |
| 2011/0012919 | A1 | * | 1/2011 | Tai | G09G 5/02 345/596 |
| 2015/0242733 | A1 | * | 8/2015 | Kobayashi | G06K 15/1881 358/3.2 |

FOREIGN PATENT DOCUMENTS

EP    2129100    12/2009

OTHER PUBLICATIONS

Gooran, Sasan et al., High-speed first-and second-order frequency modulated halftoning, Journal of Electronic Imaging 24, No. 2 (Aug. 7, 2015): 023016.

* cited by examiner

*Primary Examiner* — Dung D Tran
(74) *Attorney, Agent, or Firm* — Michael A Dryja

(57) ABSTRACT

In an example, a method includes determining, using a processor, a first halftone screen comprising a plurality of cells. Each of the cells may contain a predetermined pixel cluster pattern, and a centre position of a cluster pattern within a first cell may be different to a centre position of a cluster pattern within a second cell.

17 Claims, 3 Drawing Sheets

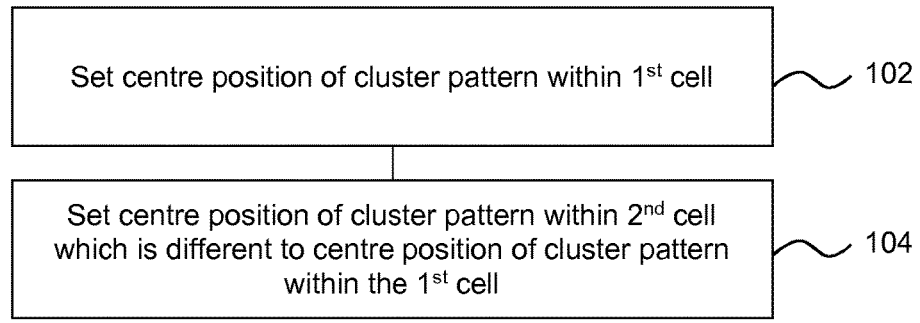
Fig. 1
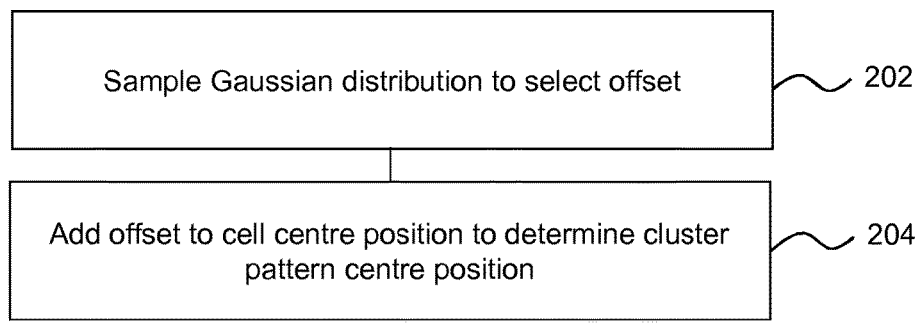
Fig. 2
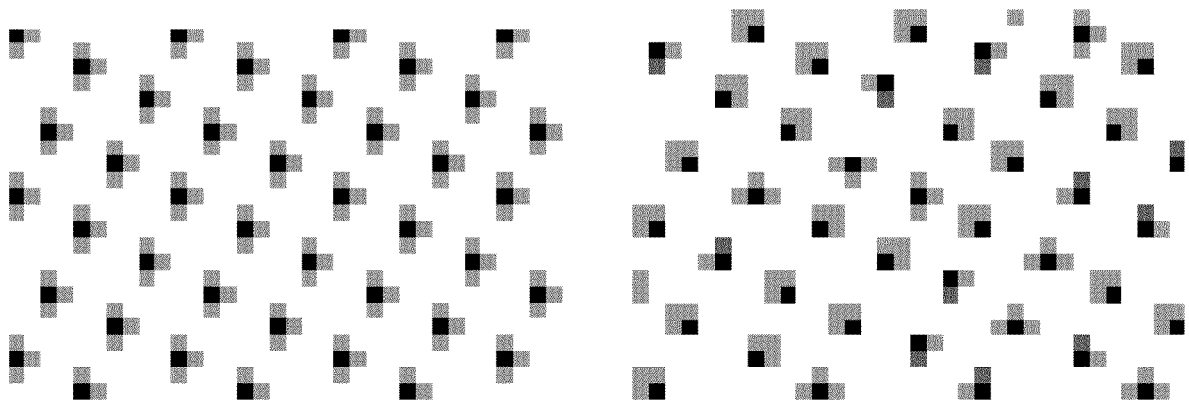
Fig. 3A                    Fig. 3B

HALFTONE SCREENS COMPRISING CLUSTER PATTERNS HAVING DIFFERENT CENTRE POSITIONS

BACKGROUND

Printing systems may convert input data (for example, data representing an image for two-dimensional printing, or data representing an object for three dimensional printing) to print instructions, which specify where print materials (for example, colorants such as inks or toners or other printable materials) are to be placed in a print operation.

Techniques used in converting data include use of halftone screens. An example of a halftone screen is an amplitude modulation halftone screen, in which the locations in which a print material may be placed are predetermined, but the number of print addressable locations which receive a particular print material may depend on the input data. For example, depending on the amount of yellow associated with a particular print addressable region in an image, an amount of yellow print agent applied to the region may be relatively high, low or zero.

BRIEF DESCRIPTION OF DRAWINGS

For a more complete understanding, reference is now made to the following description taken in conjunction with the accompanying drawings in which:

FIG. 1 is an example of a method of determining a halftone screen;

FIG. 2 is an example of a method for determining an offset for a centre position of a cluster pattern within a cell;

FIGS. 3A and 3B show examples of halftone screens for a gray level;

DETAILED DESCRIPTION

Figure 4:
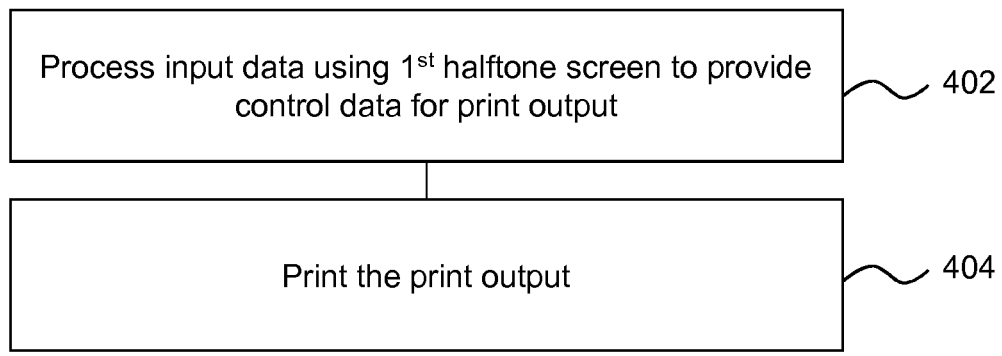
FIG. 4 is an example of a method for printing a print output.

In the case of two-dimensional printing, a print addressable location may comprise at least one pixel, and each print addressable location may be printed with at least one print agent which may comprise a colorant such as inks (for example cyan, magenta, yellow and black inks), a coating or another print material, as well as combinations of those print agents.

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one three-dimensional pixel and each three-dimensional pixel may be 'printed', i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent onto a layer of the build material. Energy may be applied to the layer and the build material on which an agent has been applied may coalesce and solidify upon cooling. In other examples, directed energy may be used to selectively cause coalescence of build material, or chemical binding agents may be used to solidify a build material. In other examples, three-dimensional objects may be generated by using extruded plastics or sprayed materials as build materials, which solidify to form an object. Objects formed using 3D printing may have surface patterns, which may be formed during object generation, for example in the first or last layers, or at the periphery of intermediate layers, or may be printed after an object has been manufactured.

In some examples of printing methods, patterns may be inadvertently formed in a printed output. For example, a 'moiré' pattern may be seen where clusters of dots repeat or, in the case of printing multiple colors (which may be printed in separate layers, or 'separations'), dots from one color may visually interfere with dots printed in another color. Such patterns can detract from image quality. Well-defined halftone screens can be used to avoid such patterns appearing in printed outputs, or to minimise their occurrence or impact.

Halftone screens may comprise precomputed threshold matrices. In use of such a screen, an image may be fragmented into squares of N*N pixels (called tiles) on which the screen is applied. The tiles may each comprise a number of cells, each of which can contain a cluster of pixels. A plurality of pixel cluster patterns may be defined, which grow in size from a centre point with an increasing gray level. For example, where an underlying image has a low gray level in a particular separation, no pixels, or a centre pixel of the pattern may be 'switched on' while all others are switched off. When a pixel is 'switched on' in this context, this results in an instruction to place a dot of ink at a corresponding location on a substrate. However, for higher gray levels, the cluster will be larger, with a greater number of pixels of the cluster pattern being switched on. The order in which the pixels (i.e. the pattern of the cluster, or more generally herein, the pixel cluster pattern) are switched on with increasing gray levels may be predetermined and deterministic, with clusters growing from the centre out according to the predetermined pattern.

In other words, each cell of a halftone screen contains a plurality of pixels. When printing a print output, the number of pixels of each cell which may be switched on (such that a corresponding region of a substrate is populated with a print agent dot) may depend on the gray level of an associated print agent in that cell. Thus, if a cell corresponds to a portion of the image/object which is black, the majority or all of the pixels may be switched on indicating the intended placement of dots of a black print agent. However, if a cell corresponds to a portion of the image/object which is gray, a proportion of pixels may be switched on while a proportion are left off. Printing dispersed black dots or dispersed black dot clusters on a white substrate produces an impression of a gray color to an observer at a distance.

While the examples of black and gray have been used here, the term gray level or 'grayscale' may be applied to any color, for example, each of a yellow, magenta, cyan and black print material set, or some other print material set, and indeed to other properties such as strength, resilience, conductivity and the like (although it may be noted that the effects discussed herein are usually visual effects).

In summary then, the result of applying a halftone screen is a binary pixelated image where every pixel can be either switched on or off. In the process of screening, each gray level is mapped to clusters of pixels that vary in size as a function of the gray level. To print an image, a plurality of screens corresponding to different colors may be used.

Designing halftone screens may comprise selecting the "geometry" of each screen, which may comprise selecting a screen angle and a resolution to combat moiré effects and to granularity. Another stage in design of a halftone screen may be "screen growing", meaning producing clusters of pixels (spots) that vary in size on a grid according to a gray level.

To consider the geometry first, screens may be designed for each of a plurality of separations, for example four separations which correspond respectively to Cyan, Magenta, Yellow and Black in a four color CMYK system. This may result in four screens being defined: in some examples, a 'square' moiré-free screen set is achieved, by using the same periodicity for all planes with the screen angles: 15°/45°/75° for CMK planes and 0° for the yellow. These angles represent a good compromise for most images, although other angles may be used in other examples.

In some examples, the different halftone screens may also have different screen resolutions, usually stated in terms of 'Line per Inch', or LPI. Screen resolution is a measure of the distances between the centres of cluster patterns. Using different LP's for different separations also assists in combating moiré effects in the composite image formed by the separations.

In amplitude modulation, a grayscale level may be defined at the level of a tile, and therefore, for a given grayscale level, tiles may be repeated (although a particular cell in a tile for a particular grayscale level may have a different number of populated pixels than another cell). An amplitude modulation screen may be made up of a plurality of repeated, or replicated tiles (i.e. tiles which will result in the same output for a given grayscale level, or expressed another way, tiles which use the same screening procedure to determine where to place print agent). Using replicated tiles reduces computational resource in processing data for printing.

In some examples, print apparatus itself can introduce patterns that can interact with halftone screens and produce periodic artefacts. Periodic artefacts are particularly eye-catching to the human eye in a printed output, and therefore can have a significant impact on the impression created by the image. Unlike moiré effects, such patterns are stochastic in nature thus cannot be readily predicted accurately before printing. For example, such patterns may arise from variations in the laser power of laser printers or printers comprising photoconductive surfaces which are addressed by lasers. Variations in laser power can result in differences in dot size. Where such artefacts have a size of greater than approximately 0.3 mm (which is roughly the threshold of human appreciation), this can result in a reduction in print quality.

FIG. 1 is an example of a method of determining a halftone screen, which may be implemented using one or more processors. In this example, the halftone screen comprises a plurality of cells wherein each cell contains a predetermined pixel cluster pattern. Pixels of a pixel cluster may be populated or not depending on a gray scale level. For example, where the halftone screen relates to a particular separation and the colour of that separation is strongly represented in a particular region of an image, a large number of pixels within the pixel cluster pattern will be populated (which in turn results in a print instruction to place at least one dot of ink at the location on a substrate corresponding to that pixel).

Block 102 comprises setting a centre position of a cluster pattern within a first cell and block 104 comprises setting a centre position of a cluster pattern within a second cell which is different to the centre position of the cluster pattern within the first cell. Each centre position is considered in terms of its respective cell. For example, the centre positions of the cluster patterns may be offset if the cells were overlaid, or the relative distance between each centre position and a fixed point in each cell (for example, the geometric centre of the cell) is different for the cluster pattern within the first cell and the cluster pattern of the second cell.

The size of the shift of the centre position (which may be considered to be a 'perturbation' of the centre position) may be relatively small, for example being an offset of less than a single pixel in size from a fixed point such as the actual centre of a cell, or less than 10 microns. For example, a shift of around a third of a pixel has been shown to provide reasonable results for a system under test. However, in principle, the offset could be larger than a pixel, and the appropriate size may be associated with the resolution of the print apparatus. For example, high-resolution systems may exhibit artefacts with generally larger shifts than low-resolution systems, and therefore the selected offset may be greater in higher resolution systems than in lower resolution systems in order to resolve such artefacts. The pixel cluster pattern may specify a pixel cluster in which pixels are switched on (i.e. the cluster 'grows') with increasing gray level in a 'centre-out' manner. In other words, the pixel cluster pattern specifies an order with which pixels are addressed, and the pixels of the cluster which are addressed may be determined according to the pixel cluster pattern and the gray level.

While providing such a difference between centre positions can remove periodic artefacts, too great a difference can result in graininess in a printed image. Therefore, a shift may be selected to be as small as possible whilst resulting in the reduction of artefacts.

In some examples, a measure of the difference between the centre positions may be selected for a particular print apparatus or class of print apparatus based on test prints. The perturbation of the position need not be tied to a particular print apparatus. For example, as discussed above, periodic artefacts may arise as a result of variation of laser power. Thus, the tolerance of laser power of the lasers may be related to the size of a perturbation which resolves periodic artefacts. The variation of laser power is likely to be relatively consistent across a particular type of laser, which may be used in a class or range of print apparatus, and thus periodic defects in all such print apparatus may be addressed in the same manner. Thus, in some examples, individual print apparatus need not be tested to determine a suitable size of a perturbation once the class thereof has been characterised.

In some examples, the method of FIG. 1 may be repeated to determine a set of halftone screens. Different separations of an image to be printed may be associated with different halftone screens, which may each have a selected screen angle to avoid moiré effects. Thus, a plurality of halftone screens, each relating to a different separation, and each having a selected screen angle (which is likely to be different for different separations) may be determined, each screen comprising cells containing relatively offset cluster patterns. As noted above, the screens of the set may have different screen angles and/or different screen resolutions (LPI). In some examples, the magnitude of the variance in the centre position of pixel cluster patterns may be different in some separations than in others, and in some examples at least one separation may have consistent placement of pixel cluster patterns within cells (for example, all cluster patterns may have a centre which coincides exactly with the geometric cell centre, or may have the same offset therefrom).

FIG. 2 is an example of a method for determining an offset for a centre position of a cluster pattern within a cell. The offset may be an offset from the geometric centre of the cell. Block 202 comprises sampling a Gaussian distribution to select an offset. In this example, the Gaussian distribution has a mean of zero and a predetermined standard deviation, wherein the standard deviation is linked to the type of periodic defect which is predicted to be seen in the print apparatus with which the halftone screen is to be used.

For example, the standard deviation may be linked to the variance in laser power, to the precision of the substrate handling apparatus, or to mechanical banding or the like. However, the source of potential periodic defects may not be modelled precisely, and indeed need not be understood in all examples. For example, test prints may be produced and, in the event that a periodic defect is observed (by human eye, or by automatic image analysis), a Gaussian distribution with a greater standard deviation may be trialled until there is a sufficient reduction in such defects in produced test prints without undue increase in graininess. The balance selected between those criteria may depend on the use case, for example the quality specifications, the resolution of the print apparatus, user preference, the distance from which the print output may be viewed and the like.

In some examples, the standard deviation of the Gaussian distribution may be around 1-10 microns, or around 1-5 microns for a print apparatus having a resolution in the range 500-1000 dots per inch (DPI) (for example, a print apparatus having a resolution of 812.8 DPI). However, a standard deviation may be selected or optimised for each screen angle and for particular print apparatus. As has been noted above, a standard deviation which is too high results in non-smooth prints (graininess) and having a standard deviation which is too low may fail to remove all periodic artefacts.

In block 204, the offset is applied to the centre position of the cell to determine the centre position of the cluster pattern.

In some examples, an offset may be applied separately in each of two orthogonal axes, i.e. there may be an offset in x and an offset in y, and these may be selected independently of each other from a Gaussian distribution (which may be the same Gaussian distribution for x and y), or else the same offset may be applied in both x and y. Screens may use the same distribution for x and y offsets, or different distributions. In some examples, both distributions may be Gaussian distributions with different standard deviations.

In other examples, the offset may be determined in some other way. For example, it may be selected based on an output from a random or pseudorandom number generator, which may in some examples be selected, or the result processed, according to an intended variance in the centre placement. In other examples, printer apparatus behaviour may be modelled, and the offset may be determined using the model. In some examples, the human visual system response may be modelled in order to identify a minimum variance to effectively eliminate such artefacts.

FIGS. 3A and 3B show tiles of respective halftone screens for a particular gray level. The centre pixel of each cluster is marked with a dark dot.

FIG. 3A shows the result when there is no difference between the placement of each pattern in each cell. As can be seen, due to the deterministic nature of the 'centre out' pixel selection methods used, each cluster is populated with switched on pixels in an identical manner.

FIG. 3B shows the result of adding a shift on a cluster by cluster (or cell by cell) basis. As the pattern, or 'cluster growth' method is based on the distance from the pattern centre point, a shift in that centre point results in different pixels being switched on in different clusters. In other words, the clusters have different shapes and the strict periodicity of the screen is broken.

For example, to consider a case where the offset is less than one pixel and the order in which the pixels are turned on in a 'centre out' manner is based on a geometric spiral originating at the centre point. When the spiral 'enters' the pixel (i.e. grows to extend within a region of space corresponding to the pixel), it is turned on. In one cell, the centre point of the spiral may be to the left of the pixel whereas in another cell the centre point of the spiral may be to the right of the pixel. The line of the geometric spiral may intersect different pixels of each cell as it grows, resulting in a different order in which the pixels are turned on.

In another example, the pixels may be turned on in order of the proximity of a fixed point (e.g. the cell centre) to the centre position of the pattern. The first pixel to be 'turned on' may be the pixel containing the centre point. Where the centre position of the pattern is to the left of a first pixel, the second pixel to be 'turned on' may be the pixel to the left of the first pixel. If however the centre position is shifted to the right of the first pixel, the second pixel to be 'turned on' may be the pixel to the right of the first pixel.

Thus, it may be seen that, even when the pixel cluster pattern of the first cell is defined in the same manner as the pixel cluster pattern of the second cell (e.g. using a spiral, or based on a minimum distance from the centre of the pattern to the centre point for an as yet turned off pixel), this can result in pixels being 'turned on' in a different order in different cells.

In some examples, the cluster pattern may result in an instruction to apply two dots to a single pixel before 'turning on' a new pixel. This is indicated in FIG. 3B where the clusters have a three pixel cluster, one of the pixels being darker to indicate that this receives more drops. This may be seen in some defined cluster patterns.

FIG. 4 is an example of a method for printing a print output. Block 402 comprises processing input data using the first halftone screen defined in FIG. 1 to provide control data for a print output. In some examples, further halftone screens (which may be defined using the method of FIG. 1, or according to some other method), may be used to process the input data, which may be image or text data or the like, in order to define a plurality of separations.

Block 404 comprises printing the print output, for example using any print apparatus such as a laser printer, a liquid electro-photographic printer, an inkjet printer, a 3D printer or the like.

Figure 5:
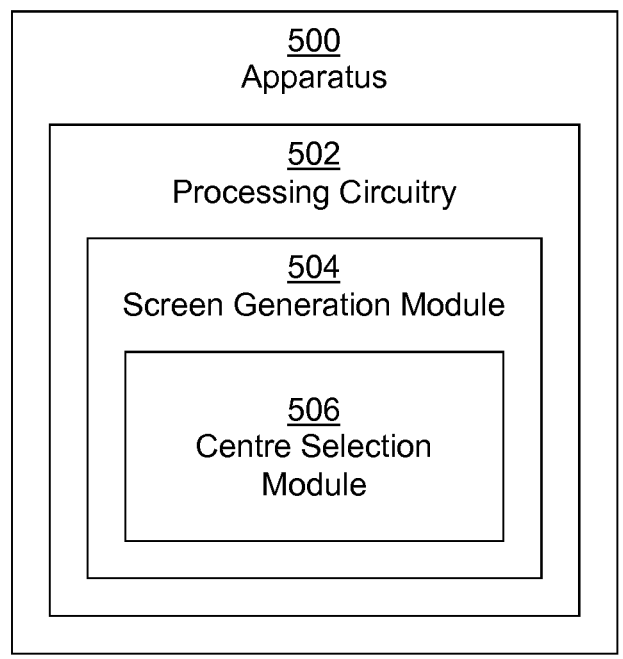
FIGS. 5 and 6 show examples of apparatus comprising processing circuitry.

FIG. 5 shows an example of apparatus 500 comprising processing circuitry 502, wherein the processing circuitry 502 comprises a screen generation module 504 to generate, for each of a plurality of image separations, a halftone screen comprising a plurality of cells containing a predetermined pixel cluster pattern. The screen generation module 504 comprises a centre selection module 506, to select a centre position of the predetermined pixel cluster pattern of each cell, such that, for at least one cell, the centre position of a pixel cluster pattern is offset from the centre of the cell and the centre position of a pixel cluster pattern in a first cell is different from the centre position of a pixel cluster pattern in a second cell.

This results in a set of screens having different centre positions of the pixel cluster patterns within their respective cells.

Figure 6:
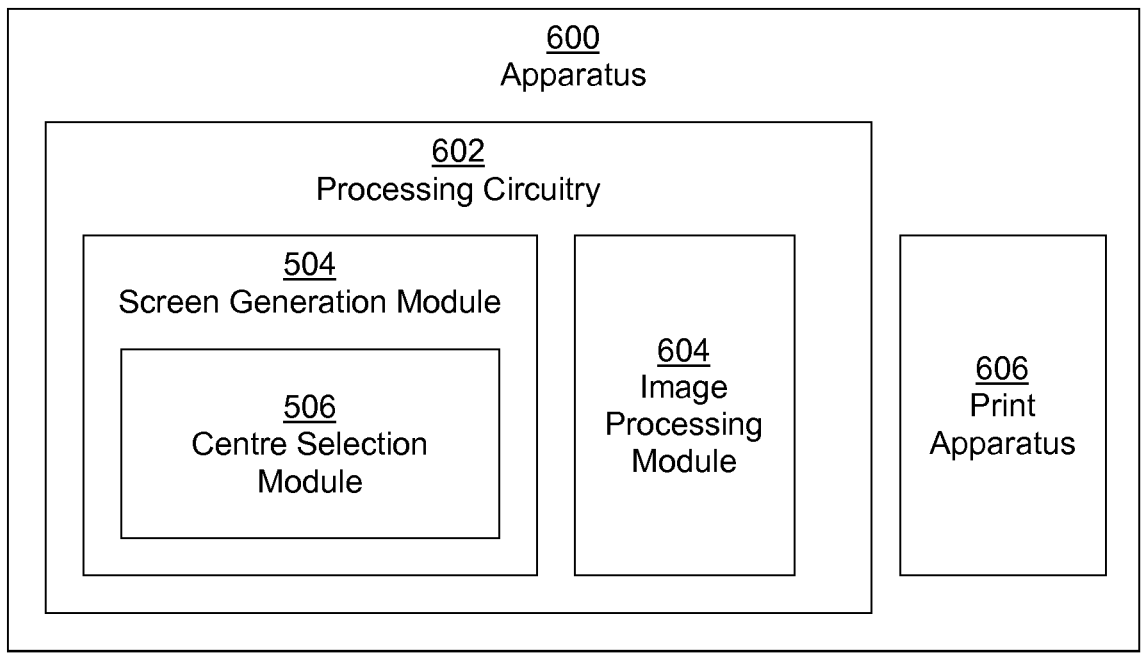

FIG. 6 is an example of an apparatus 600 comprising processing circuitry 602. In addition to the screen generation module 504 comprising a centre selection module 506 described in relation to FIG. 5, the processing circuitry 602 further comprises an image processing module 604 to process input image data using the halftone screens to determine print control data. In some examples, the image processing module 604 is to determine a grayscale level of an image portion and to select ('turn on') pixels within the pixel pattern based on the grayscale level, and wherein the print control data specifies that print agent is to be applied to a region of a substrate corresponding to the selected pixel(s).

The apparatus 600 further comprises a print apparatus 606 to print an image using the print control data. The print apparatus 606 may comprise any print apparatus such as a laser printer, a liquid electro-photographic printer, an inkjet printer, a 3D printer or the like.

The apparatus 500, 600 may carry out any of the methods described in relation to FIGS. 1 and 2 and the apparatus 600 may carry out the method of FIG. 4.

Figure 7:
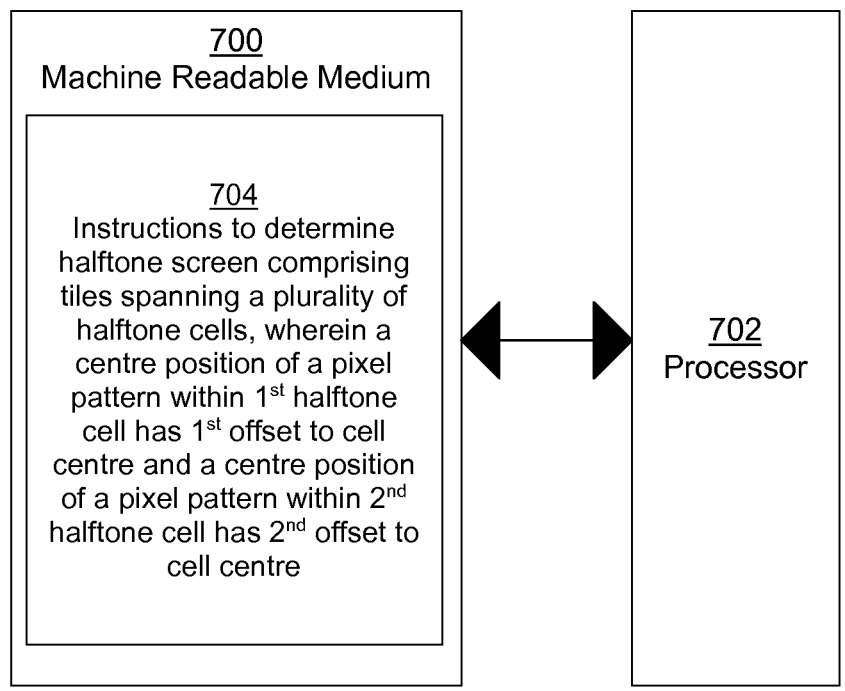
FIG. 7 is a simplified schematic of an example non-transitory machine readable medium associated with a processor.

FIG. 7 is an example of a tangible and non-transitory machine readable medium 700 in association with a processor 702. The machine readable medium 700 comprises instructions 704 which, when executed by the processor 702, cause the processor 702 to determine a halftone screen comprising replicated tiles spanning a plurality of halftone cells, wherein a centre position of a pixel pattern within a first halftone cell of a tile has a first offset to the centre of the first halftone cell and a centre position of a pixel pattern within a second halftone cell of a tile has a second offset to the centre of the second halftone cell.

In some examples, the machine readable medium 700 further comprises instructions which, when executed by the processor 702, cause the processor 702 to, in determining the halftone screen, select an offset from the centre of the cell, wherein the offset is selected on a cell by cell basis. The offset may for example be selected from a Gaussian distribution as described above.

The machine readable medium 700 may comprise instructions which cause the processor to carry out any of the blocks of FIG. 1 or FIG. 2, or block 402. The machine readable medium 700 may comprise instructions which cause the processor 702 to act as the processing circuitry 502 of FIG. 5, or as the processing circuitry 602 of FIG. 6.

The screen generation module 504, centre selection module 506 and/or the image processing module 604 may be implemented with one or a plurality of processors executing machine readable instructions stored in a memory, or one or a plurality of processors operating in accordance with instructions embedded in logic circuitry. It is noted that in at least one example described herein, the term "module" refers to a hardware component of the apparatus.

Examples in the present disclosure can be provided as methods, systems or machine readable instructions, such as any combination of software, hardware, firmware or the like. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that flows and/or blocks in the flow charts and/or block diagrams, as well as combinations of the flows and/or blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the processing circuitry 502, 602 (for example, the screen generation module 504, centre selection module 506 and/or the image processing module 604) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    selecting, using a processor, an offset by sampling a specified distribution;
    determining, using the processor, a center position of a pixel cluster pattern of a first cell of a first halftone screen comprising a plurality of cells including the first cell and a second cell, by applying the selected offset to a true center of the pixel cluster pattern of the first cell;
    reselecting, using the processor, the offset by sampling the specified distribution; and
    determining, using the processor, a center position of a pixel cluster pattern of the second cell by applying the reselected offset to a true center of the pixel cluster pattern of the second cell,
    wherein the center position of the pixel cluster pattern of the first cell is different than the center position of the pixel cluster pattern of the second cell.

2. The method according to claim 1, wherein the specified distribution is a Gaussian distribution.

3. The method according to claim 2, wherein the Gaussian distribution has a mean of zero and a predetermined standard deviation.

4. The method according to claim 1, wherein the selected offset and the reselected offset each have a size of less than one pixel.

5. The method according to claim 1, further comprising:
    determining, using the processor, a second halftone screen having a different screen angle to the first halftone screen and comprising a plurality of cells including a first cell and a second cell,
    wherein a center position of a pixel cluster pattern of the first cell of the second halftone screen is different than a center position of a pixel cluster pattern of the second cell of the second halftone screen.

6. The method according to claim 1, wherein the pixel cluster pattern of the first cell is defined in a same manner as the pixel cluster pattern of the second cell.

7. The method according to claim 1, further comprising:
    processing input data using the first halftone screen to provide control data for a print output.

8. The method according to claim 7, further comprising:
    printing the print output.

9. An apparatus comprising processing circuitry to perform processing comprising:
    selecting an offset by sampling a specified distribution;
    determining a center position of a pixel cluster pattern of a first cell of a first halftone screen comprising a plurality of cells including the first cell and a second cell, by applying the selected offset to a true center of the pixel cluster pattern of the first cell;
    reselecting the offset by sampling the specified distribution; and
    determining a center position of a pixel cluster pattern of the second cell by applying the reselected offset to a true center of the pixel cluster pattern of the second cell,
    wherein the center position of the pixel cluster pattern of the first cell is different than the center position of the pixel cluster pattern of the second cell.

10. The apparatus according to claim 9, wherein the processing further comprises:
    processing input image data using the halftone screen to determine print control data.

11. The apparatus according to claim 10, wherein the processing further comprises:
    determining a grayscale level of an image portion;
    selecting pixels within the pixel cluster pattern of each of the first and second cells based on the grayscale level,
    wherein the print control data specifies that print agent is to be applied to a region of a substrate corresponding to the selected pixels.

12. The apparatus according to claim 10, further comprising:
    print hardware to print an image using the print control data.

13. The apparatus according to claim 9, wherein the specified distribution is a Gaussian distribution.

14. The apparatus according to claim 13, wherein the Gaussian distribution has a mean of zero and a predetermined standard deviation.

15. A non-transitory machine readable medium comprising instructions which, when executed by a processor, cause the processor to perform processing comprising:
    selecting an offset by sampling a specified distribution;
    determining a center position of a pixel cluster pattern of a first cell of a first halftone screen comprising a plurality of cells including the first cell and a second cell, by applying the selected offset to a true center of the pixel cluster pattern of the first cell;
    reselecting the offset by sampling the specified distribution; and
    determining a center position of a pixel cluster pattern of the second cell by applying the reselected offset to a true center of the pixel cluster pattern of the second cell,
    wherein the center position of the pixel cluster pattern of the first cell is different than the center position of the pixel cluster pattern of the second cell.

16. The non-transitory machine readable medium according to claim 15, wherein the specified distribution is a Gaussian distribution.

17. The non-transitory machine readable medium according to claim 16, wherein the Gaussian distribution has a mean of zero and a predetermined standard deviation.

* * * * *